United States Patent
Carlson

(10) Patent No.: US 8,551,415 B2
(45) Date of Patent: Oct. 8, 2013

(54) UV ASSISTED POLYMER MODIFICATION AND IN SITU EXHAUST CLEANING

(75) Inventor: David Keith Carlson, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 836 days.

(21) Appl. No.: 12/196,894

(22) Filed: Aug. 22, 2008

(65) Prior Publication Data

US 2010/0047137 A1 Feb. 25, 2010

(51) Int. Cl.
*B01J 19/12* (2006.01)
(52) U.S. Cl.
USPC ............................................. 422/186.3
(58) Field of Classification Search
USPC ............................................. 422/186.3
See application file for complete search history.

(56) References Cited

U.S. PATENT DOCUMENTS

| | | | |
|---|---|---|---|
| 6,080,281 A * | 6/2000 | Attia ........................ | 204/157.3 |
| 6,322,756 B1 * | 11/2001 | Arno et al. .................... | 422/171 |
| 6,354,241 B1 * | 3/2002 | Tanaka et al. ............. | 118/723 E |
| 6,368,567 B2 | 4/2002 | Comita et al. | |
| 2002/0139005 A1 * | 10/2002 | Thomas ............................ | 34/72 |
| 2005/0156497 A1 * | 7/2005 | Nakamura ..................... | 313/238 |
| 2007/0113421 A1 * | 5/2007 | Uhara et al. .................... | 34/275 |

FOREIGN PATENT DOCUMENTS

JP   2001300260 A   * 10/2001

OTHER PUBLICATIONS

English Translation of Japanese Document No. JP 2001-300260 A provided by the Industrial Property Digital Library: Ebihara N. et al.; Dcomposition of Non-Metallic Fluoride in Gas, for Purification of Exhaust Gas Ejected from Semiconductor Plant, Involves Irradiating Gas with Ultraviolet Rays in the Presence of a Photocatalyst; Oct. 30, 2001.*

* cited by examiner

*Primary Examiner* — Kevin Joyner
(74) *Attorney, Agent, or Firm* — Moser Taboada; Alan Taboada

(57) ABSTRACT

Methods and apparatus for the removal of exhaust gases are provided herein. In some embodiments, an exhaust apparatus may include a housing defining an inner volume; an inlet and an outlet formed in the housing to facilitate flow of an exhaust gas through the inner volume, wherein the inlet is configured to be coupled to a process chamber to receive an exhaust therefrom; and an ultraviolet light source to provide ultraviolet energy to the inner volume. The ultraviolet light source may provide sufficient energy to at least partially decompose the exhaust gases. In some embodiments, the ultraviolet light source may provide ultraviolet energy until the exhaust gas has cooled below a critical temperature.

10 Claims, 2 Drawing Sheets

UV ASSISTED POLYMER MODIFICATION AND IN SITU EXHAUST CLEANING

BACKGROUND OF THE INVENTION

1. Field of the Invention

Embodiments of the present invention generally relate to semiconductor processing, and more particularly, to apparatus for removing exhaust gases from semiconductor process chambers.

2. Description of the Related Art

Many films used in electronic device fabrication are formed in semiconductor process chambers using process gases that may be reacted to form a desired layer on the substrate. The process gases that do not react and gaseous byproducts formed during processing are then typically removed through an exhaust system of the process chamber.

Unfortunately, unreacted process gases and process gas byproducts can polymerize and/or condense on the surfaces of components of the exhaust system (e.g., within exhaust conduits). During continuous operation of the chamber, the polymerization and/or condensation of byproducts can result in the constant, gradual formation of highly viscous liquids or solids along the interior walls of the exhaust apparatus. As a result of this polymer build up, the exhaust apparatus can become at least partially blocked, reducing reactor exhaust flow efficiencies, increasing the possibility of substrate contamination, and generally reducing overall chamber performance.

To address this problem, some exhaust apparatus may include exhaust treatment devices such as heaters or RF power sources for treating the exhaust gases to prevent or reduce polymer formation within the exhaust apparatus. Unfortunately, these methods have drawbacks as well. For example, apparatus which utilize heaters to react excess gases from the process chamber have temperature constraints (such as, about 500 degrees Celsius), which cause byproducts to still remain. Moreover, while the exhaust gases may not condense or polymerize where heated, the polymerization may still occur downstream of the heater, once the exhaust gases start to cool. In addition, such systems do not work well for some processes. For example, such heating systems do not work well with reduced pressure deposition of polysilicon since polysilicon formation causes serious particle problems.

For reduced pressure polysilicon applications the exhaust gases may be treated with high frequency RF and nitrogen trifluoride ($NF_3$) to chemically etch the exhaust deposit. However, this methodology may raise issues with fluorine contamination, materials compatibility, hazardous waste disposal, and serious damage to the exhaust apparatus if not used properly.

Thus, there is a need in the art for improved methods and apparatus for treating exhaust gases from semiconductor processes.

SUMMARY

Methods and apparatus for the removal of exhaust gases are provided herein. In some embodiments, an exhaust apparatus may include a housing defining an inner volume; an inlet and an outlet formed in the housing to facilitate flow of an exhaust gas through the inner volume, wherein the inlet is configured to be coupled to a process chamber to receive an exhaust therefrom; and an ultraviolet light source to provide ultraviolet energy to the inner volume. The ultraviolet light source may provide sufficient energy to at least partially decompose the exhaust gases. In some embodiments, the ultraviolet light source may provide ultraviolet energy until the exhaust gas has cooled below a critical temperature.

In some embodiments an apparatus for processing a substrate is provided. In some embodiments, an apparatus for processing a substrate may include a process chamber; and an exhaust apparatus coupled to the process chamber, the exhaust apparatus including a housing defining an inner volume; an inlet and an outlet formed in the housing to facilitate flow of an exhaust gas through the inner volume; and an ultraviolet light source to provide ultraviolet energy to the inner volume.

In some embodiments a method for removing an exhaust gas is provided. In some embodiments, a method for removing an exhaust gas may include providing an exhaust gas to an exhaust apparatus; exposing the exhaust gas to an ultraviolet light source configured to provide sufficient energy to at least partially decompose the exhaust gas; and removing the exposed exhaust gas from the exhaust apparatus.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
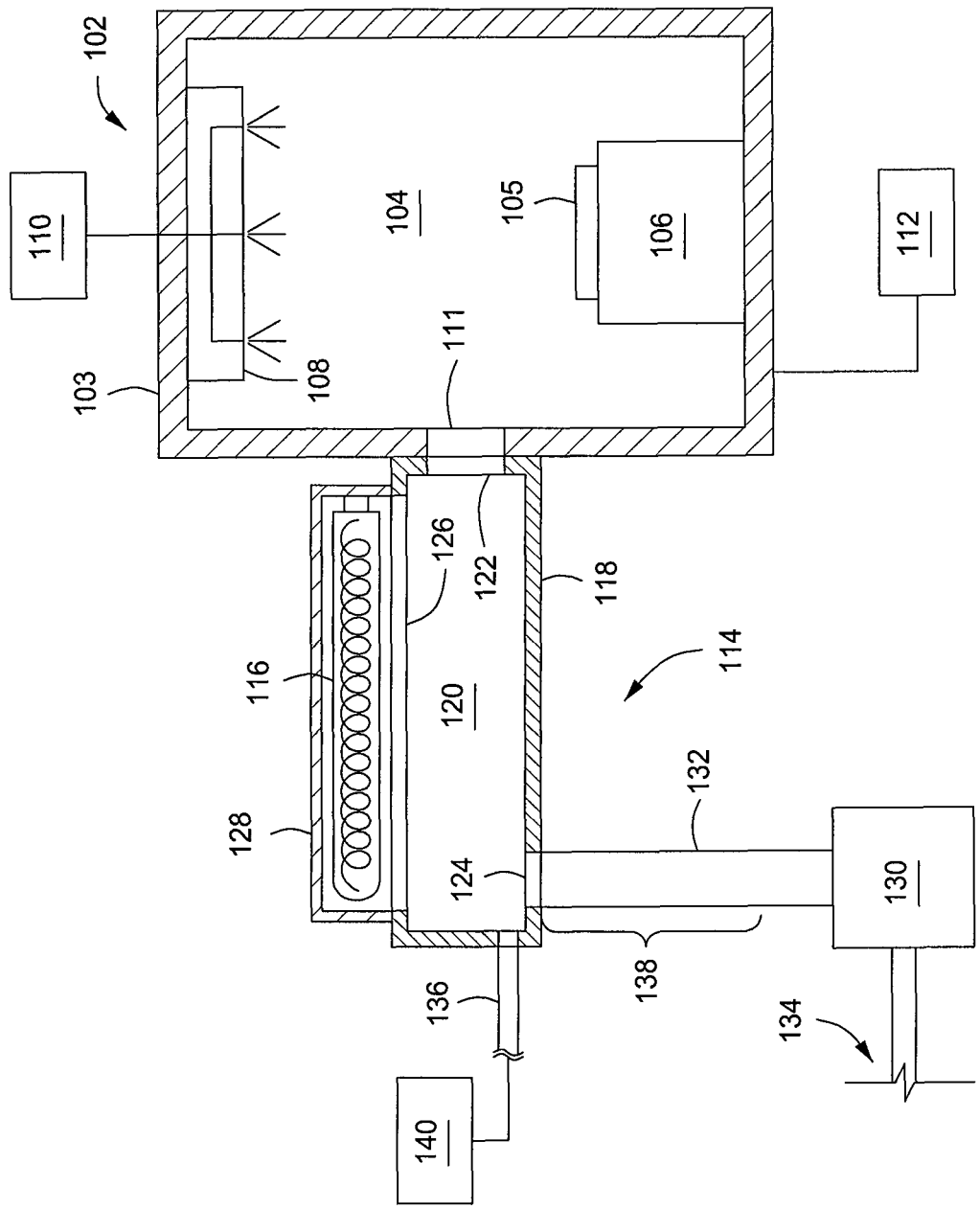
FIG. 1 depicts a semiconductor processing chamber having an exhaust apparatus in accordance with some embodiments of the present invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Methods and apparatus for the removal of exhaust gases from a semiconductor process chamber are provided herein. In some embodiments, an exhaust apparatus having an ultraviolet (UV) light source is provided. The UV light source may provide sufficient energy to exhaust gases in the exhaust apparatus to at least partially decompose the exhaust gases. The UV light source may advantageously prevent polymerization, self-polymerization, condensation, or the like, of the exhaust gases on the interior walls of the exhaust apparatus. The use of a UV light source may be further advantageous for use in reduced pressure applications, wherein the exhaust gas is present in reduced concentrations. In some embodiments, one or more supplemental gases may be provided to the exhaust apparatus to react with the exhaust gases, thereby further limiting polymerization and/or condensation of the exhaust gases.

An apparatus for processing a semiconductor substrate in accordance with some embodiments of the present invention is illustrated in FIG. 1. The apparatus 100 includes a semiconductor process chamber 102, a gas supply 110, a controller 112, and an exhaust apparatus 114. Although illustratively shown as coupled to an illustrative semiconductor process chamber 102 in FIG. 1, an exhaust apparatus in accordance with the present disclosure may be utilized in other suitable process chambers as well. For example, the exhaust apparatus 114 may be coupled to process chambers such as those performing, e.g., epitaxial growth, reduced pressure epitaxial growth, chemical vapor deposition (CVD), or any other semiconductor process chamber using processes requiring the removal of exhaust gases that may undesirably condense or form polymers on the interior of the exhaust system of the process chamber. One such exemplary chamber that may benefit from the use of an exhaust apparatus as described herein is the RP EPI chamber available from Applied Materials, Inc. of Santa Clara, Calif.

The process chamber 102 may include a process chamber wall 103 at least partially defining a processing volume 104. A substrate support pedestal 106 may be disposed in the process chamber 102 to support a substrate 105 thereupon during processing. The substrate support pedestal 106 may be any support pedestal for holding a semiconductor substrate and may include such components as an electrostatic chuck, clamps, edge rings, guide pins, or the like for physically locating and retaining the substrate. The substrate support pedestal 106 may also include additional components for processing the substrate 105, such as an electrode for supplying DC or RF bias power, systems for the uniform supply or removal of heat from the substrate 105 or a surface of the substrate support pedestal 106, or the like.

The gas supply 110 may provide one or more suitable process gases for processing the substrate and/or for maintaining the process chamber 102 (such as deposition gases, etch gases, cleaning gases, or the like). The gas supply 110 may comprise a plurality of gas sources supplying one or more process gases to the process chamber 102. Each process gas may be supplied independently, or in combination with additional process gases. Other components for controlling the flow of gases to the process chamber 102, such as flow controllers, valves, or the like, are, for simplicity, not shown.

The gas supply 110 may provide process gases to the process chamber 102 in any suitable manner, such as via a showerhead 108, gas distribution nozzles, inlets, or the like. The size, geometry, number, and location of holes in the showerhead 108 can be selectively chosen to facilitate a pre-defined pattern of gas flow. The showerhead 108 depicted in FIG. 1 is exemplary and gases may enter the process chamber through other suitable mechanisms, such as nozzles, inlets, and/or fixtures in the chamber wall, proximate the substrate, or by any other suitable means for performing the intended process in the process chamber 102. In some embodiments, the showerhead 108 may form at least part of an electrode for supplying DC or RF power for the purposes of creating or maintaining a plasma from one or more of the process gases supplied by the gas supply 110. In some embodiments, the gas supply 110 may provide process gases to the process chamber 102 via side inlets. For example, some process chambers, such as those configured for epitaxial deposition of silicon may utilize a cross-flow gas distribution system wherein process gases a flowed across the surface of a substrate being processed.

The exhaust apparatus 114 may be coupled to the process chamber 102 via an exhaust port 111. The exhaust apparatus 114 may be coupled to the process chamber 102 at any suitable location for exhausting the process chamber 102, such as along a sidewall of the chamber, as illustrated in FIG. 1. For example, depending upon chamber design and process gas flow considerations, the exhaust port 111 may be located at any suitable location in the process chamber 102, such as in a sidewall of the process chamber, above or below the surface of the substrate support pedestal 106, in a floor of the process chamber, or in any other suitable location.

The exhaust apparatus 114 generally includes a housing 118 defining an inner volume 120 and a UV light source 116 configured to provide UV energy to exhaust gases present in the inner volume 120 of the housing during use. The housing 118 may be of any desirable shape, volume, or composition commensurate with holding, flowing, or reacting the exhaust gases. It is contemplated that the shape, volume, and composition of the housing 118 may depend on the identity of the exhaust gases, the desired residence time of exhaust gases flowing through the housing 118, or the like. The housing 118 generally includes an inlet 122 for coupling to the exhaust port 111 and an outlet 124 for coupling to an exhaust pump 130.

The UV light source 116 may be any suitable UV light source having suitable intensity and wavelength required for providing energy necessary for at least partially decomposing an exhaust gas as described herein. The UV light source 116 may be selected and/or operated to advantageously provide this energy at a low temperature, thereby facilitating cooling of the exhaust gases. An exemplary UV light source 116 may be one of the Osram Xeradex® Systems, available from Osram Sylvania Inc. of Danvers, Mass., such as the Xeradex® 20 lamp. Of course, the particular UV source, number of sources, geometry, and the like, may be configured as desired to provide the desired quantity of UV energy to the exhaust gases present in the exhaust apparatus 114.

In some embodiments, the UV light source 116 may have a wavelength of about 124 nm or greater. In some embodiments, the UV light source 116 may have a wavelength of about 172 nm or greater. However, the UV light source 116 may have any suitable wavelength and intensity necessary for at least partially decomposing an exhaust gas, preventing the polymerization and/or self-polymerization, or preventing the condensation of an exhaust gas can be used. In some embodiments, the UV light source 116 may comprise a mercury (Hg) broadband UV light source for providing UV light energy having a range of wavelengths.

The UV light source 116 may be disposed in a lamp housing 128. The lamp housing 128 may be vacuum sealed or may be purged with a suitable inert gas or gases. The lamp housing 128 may be coupled to the housing 118 proximate a transparent window 126 for luminescently coupling to at least a portion of the inner volume 120 of the housing 118. The transparent window 126 may comprise any suitable material, thickness, and/or geometry that facilitates illumination of the inner volume 120 by the UV light source 116. The transparent window may be non-absorbing, or at most weakly absorbing in the wavelength range utilized by the light source 116. In some embodiments, the transparent window may comprise quartz.

The outlet 124 may be coupled to the vacuum pump 130 directly, or via a conduit 132, as illustrated in FIG. 1. In some embodiments, the outlet 124 and the conduit 132 may be positioned in the housing 118 such that light from the UV light source 116 may travel at least partially down the conduit 132. Although shown as being straight, the conduit 132 may be curved, angled, or otherwise configured to couple the housing 118 to the vacuum pump 130. In some embodiments, the conduit 132 may have at least a straight portion 138 having a length at least as long as necessary to allow the exhaust gases travelling therethrough to cool below a critical temperature at which the particular exhaust gases condense, thereby advantageously minimizing polymerization that may occur downstream of the exhaust apparatus 114 (referred to herein as the critical temperature). For example, when the exhaust gas comprises silicon, such as when depositing silicon utilizing silicon hydride ($SiH_2$) as a precursor, the length of the straight portion 138 of the conduit 132 may be at least about 10 cm and/or up to about 100 cm. Of course the desired length of the straight portion 138 of the conduit 132 will depend many factors such as upon the flow rate, cooling rate, and or critical temperature of the exhaust gases utilized in a particular process.

In some embodiments, an interior surface of the conduit 132 may be sufficiently smooth so as to minimize the turbulent flow of the exhaust gas flowing therethrough. Turbulent flow may undesirably promote mixing, reaction, and polymerization, or self-polymerization of the exhaust gas. In some embodiments, the interior surface of the gas outlet tube may have an root mean square (RMS) surface roughness of less than about 10 Ra. In some embodiments, the interior surface of the gas outlet tube may have an root mean square (RMS) surface roughness of between about 5 Ra to about 10 Ra. The length, diameter, geometry, interior surface roughness, and/or composition of the conduit 132 may be varied to facilitate at least one of improved flow characteristics (e.g., non-turbulent flow), increased cooling rates of the exhaust gas, or the like.

In some embodiments, the exhaust apparatus 114 may further comprise a supplemental gas inlet 136 for supplying a supplemental gas from a supplemental gas source 140 to the inner volume 120. The supplemental gas may be any suitable gas that may be reacted with the exhaust gases to prevent polymerization or to break down polymerized exhaust gases. The supplemental gas may be selected such that illumination thereof by the UV light source 116 may form a reactive species for reacting with the exhaust gases. In some embodiments the supplemental gas source 140 may provide one or more etchant species, such as a halogen-containing gas, for example, hydrochloric acid (HCl), chlorine ($Cl_2$), fluorine ($F_2$), nitrogen trifluoride ($NF_3$), or the like. Alternatively or in combination the supplemental gas source 140 may provide one or more oxidant species, such as an oxygen-containing gas, for example, oxygen ($O_2$), water ($H_2O$), or the like. Alternatively or in combination, one or more of the above supplemental gases may be provided directly into the process chamber 102 (for example from the gas supply 110, or similar gas supply).

Upon being drawn through the exhaust apparatus 114 by the vacuum pump 130, the exhaust gases may be expelled from the vacuum pump 130 into an exhaust system 134, as illustrated in FIG. 1. The exhaust system 134 may include scrubbers, filtration units, or other forms of treatment and/or remediation devices for treating the exhaust gases prior to release into the surrounding environment or prior to capturing the exhaust gases (or components thereof) for further treatment, reuse, or disposal as may be desired or required.

The controller 112 generally comprises a central processing unit (CPU), a memory, and support circuits and may be coupled to one or more of the components of the apparatus 100 (or other controllers coupled thereto), and is generally capable of controlling any of the components individually or in unison for performing a process within the chamber 102. In operation, the controller 112 controls components and operations of the apparatus 100, and/or provides instructions to controllers associated with these components. In some embodiments, the controller 112 is configured to cause the exhaust apparatus 114 to provide sufficient energy via the UV light source 116 to at least partially decompose exhaust gases flowing through the exhaust apparatus 114 as discussed below with respect to FIG. 2.

Figure 2:
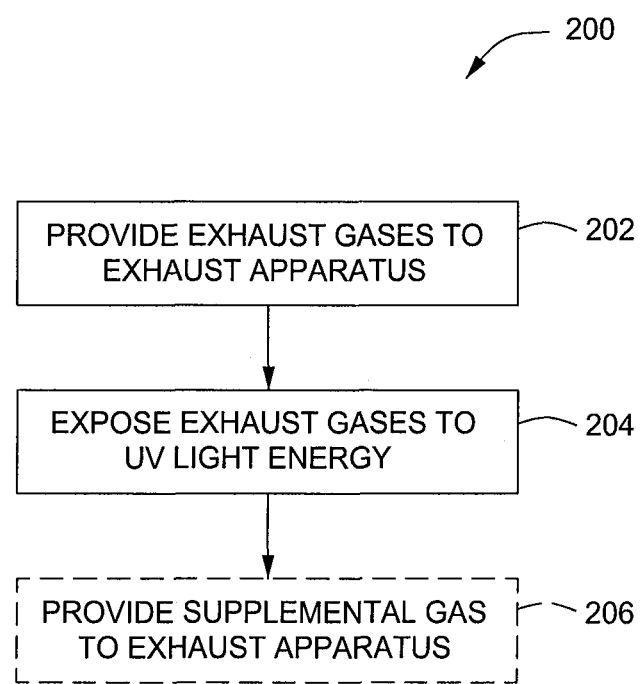
FIG. 2 depicts a flow chart of a method for the removal of an exhaust gas in accordance with some embodiments of the present invention.

In operation, the apparatus 100 may be utilized to process a substrate with reduced polymer formation/deposition within the exhaust system of the apparatus 100 by treatment of the exhaust gases with the exhaust apparatus 114. For example, inventive methods for the removal of exhaust gases in accordance with some embodiments of the present invention are depicted in FIG. 2, and described below with respect to the apparatus 100.

The method 200 generally begins at 202 where exhaust gases from the process chamber 102 are provided to the exhaust apparatus 114. The exhaust gases may comprise at least one of excess and/or unreacted process gases (e.g., from the processing of a substrate), process gas byproducts and/or processing byproducts (e.g., formed by a reaction that occurs in the processing volume 104 between at least one or more process gases or between the substrate 105 and one or more process gases), or the like, and will vary depending upon the process being performed in the process chamber 102. In some embodiments, the exhaust gases may comprise one or more of silicon, hydrogen, or a halogen. For example, in some embodiments, the exhaust gas may include at least one silicon species, such as at least one of silicon hydride radicals ($SiH_2$), silane ($SiH_4$), disilane ($Si_2H_6$), dichlorosilane ($SiH_2Cl_2$), trichlorosilane ($SiHCl_3$), or other higher order silicon and hydrogen containing gases, or the like. Alternatively or in combination, in some embodiments, the exhaust gas may include at least one germanium species, such as germane ($GeH_4$), or the like.

The exhaust gases enter the inner volume 120 of the exhaust gas apparatus 114 at the inlet 122 via the exhaust port 111. The exhaust gases may be of sufficient temperature to be reactive by polymerization and/or self-polymerization (referred to herein simply as polymerization). Herein, polymerization is understood to mean a polymerizing reaction between exhaust gases having different chemical compositions, and self-polymerization is understood to mean a polymerizing reaction between exhaust gases having the same chemical composition. The polymerization and self-polymerization may result in condensation of a polymerized product of one or more exhaust gases on the interior surfaces of the exhaust apparatus 114. In some embodiments, the temperature of the exhaust gases may be greater than a critical temperature (for example, in some embodiments, greater than about 100 degrees Celsius) and may cool as it travels through the exhaust apparatus 114 (and/or through the pump 130 and exhaust system 134).

Next, at 204, the exhaust gases in the exhaust apparatus 114 are exposed to light energy from the UV light source 116. The UV light source 116 provides sufficient energy to at least partially decompose the exhaust gas, thereby breaking down longer polymer chains that may condense onto the surfaces of the exhaust apparatus 114. In some embodiments, the UV light source 116 may provide energy sufficient to decompose the exhaust gases until the exhaust gases cool below a critical temperature at which the exhaust gases no longer polymerize. For example, in some embodiments where silicon, hydrogen, and chlorine are present, the critical temperature may be between about 100 degrees to about 250 degrees Celsius. In some embodiments, the UV light source 116 is configured to provide energy to the exhaust gases present in the inner volume 120 and at least up to a length of the straight portion 138 of the conduit 132 beyond which the exhaust gases have cooled to below the critical temperature.

Exposure to the UV light source may advantageously reduce polymerization of the exhaust gases within the exhaust apparatus 114, pump 130 and/or the exhaust system 134 of the apparatus 100. Moreover, the UV light source may advantageously reduce polymerization of the exhaust gases while allowing the exhaust gases to cool to below the critical temperature at which polymerization no longer occurs, thereby avoiding pushing polymerization reactions downstream of the exhaust apparatus and advantageously reducing polymer formation in other portions of the apparatus 100 (such as the pump 130 and/or the exhaust system 134).

The wavelength of energy provided by the UV light source 116 may be selected based upon the exhaust gases being processed. For example, in some embodiments, wherein the exhaust gases include chlorine ($Cl_2$), energy may provided by the UV light source 116 at a wavelength of about 124 nm. In some embodiments, wherein the exhaust gases include hydrochloric acid (HCl), energy may be provided by the UV light source 116 at a wavelength of about 172 nm. The intensity of the UV light source 116 may also be adjusted as necessary, for example, based upon the concentration of the exhaust gases provided to the exhaust apparatus 114. For instance, a reduced concentration of the exhaust gases may require reduced intensity from the light source 116 for a reaction to occur.

In some embodiments, for example wherein the exhaust gases substantially comprise non-halogen containing gases, one or more supplemental gases may be provided into the exhaust apparatus 114 along with the exhaust gases, for example, from the supplemental gas source 140 via the supplemental gas inlet 136 (as shown in FIG. 2 in phantom at 206). The supplemental gas may comprise an etchant and/or an oxidant gas, such as one or more of the supplemental gases discussed above. The supplemental gas (when present) may be at least partially decomposed by energy provided by the UV light source 116, thereby forming a reactive species which may react with the exhaust gases to form a volatile byproduct that does not polymerize.

Thus, the inventive exhaust apparatus 114 may be utilized in connection with processes that utilized gases that may otherwise form polymers and condense on the walls of the exhaust systems of the process chamber. For example, exhaust gases such as $SiH_2$ radicals and $Cl_2$, which may be utilized in chemical vapor deposition of silicon-containing films, may react to form $SiCl_4$ and $Si_xH_yCl_z$, wherein x, y, and z are integers greater than 1. The $Si_xH_yCl_z$ may form long polymer chains and would typically deposit or condense onto the surface of the exhaust systems of the process chamber. Using the inventive exhaust apparatus 114, the exhaust gases may be provided with energy by the UV light source 116, thereby breaking down the long chains of $Si_xH_yCl_z$ into shorter, more volatile chains, and further preventing the formation of $Si_xH_yCl_z$ in the exhaust apparatus 114. Moreover, the exhaust apparatus 114 further allows the exhaust gases to cool to below the critical temperature while breaking down the exhaust gases, thereby allowing the exhaust gases to by removed from the exhaust apparatus 114 and pumped away without further downstream contamination of the exhaust systems.

Upon completion of 204, the method 200 ends and the exhaust gases are removed from the exhaust apparatus 114 and pumped into the exhaust system 134 by the pump 130, wherein the exhaust gases may be exhausted, treated, stored, or otherwise processed as necessary.

Thus, methods and apparatus for the removal of exhaust gases from process chambers has been provided herein. The inventive methods and apparatus utilize UV light energy provided by a UV light source to at least partially decompose exhaust gases and/or to react the exhaust gases to form byproduct gases with improved volatility and/or less reactivity at operating temperatures, thereby reducing polymerization and condensation on the interior walls of the exhaust apparatus.

While the foregoing is directed to embodiments of the present invention, other and further embodiments of the invention may be devised without departing from the basic scope thereof, and the scope thereof is determined by the claims that follow.

What is claimed is:

1. A method for removing an exhaust gas, comprising:
    flowing an exhaust gas from a semiconductor process chamber through an exhaust apparatus coupled to the semiconductor process chamber, wherein the exhaust gas flows through an inner volume of the exhaust apparatus substantially free from obstruction;
    exposing the exhaust gas within the exhaust apparatus to an ultraviolet light source to at least partially decompose the exhaust gas as it flows through the exhaust apparatus;
    exposing the exhaust gas to a supplemental gas comprising a halogen-containing gas; and
    flowing the at least partially decomposed exhaust gas from the exhaust apparatus.

2. The method of claim 1, wherein the exhaust gas comprises at least one of silicon hydride radicals ($SiH_2$), silane ($SiH_4$), disilane ($Si_2H_6$), dichlorosilane ($SiH_2Cl_2$), trichlorosilane ($SiHCl_3$), or germane ($GeH_4$).

3. The method of claim 1, wherein the supplemental gas comprises at least one of hydrochloric acid (HCl), chlorine ($Cl_2$), fluorine ($F_2$), or nitrogen trifluoride ($NF_3$), and optionally further comprises at least one of oxygen ($O_2$) or water vapor ($H_2O$).

4. The method of claim 1, wherein the ultraviolet light source provides ultraviolet energy to the supplemental gas to create a reactive species.

5. The method of claim 1, wherein the ultraviolet light source provides energy to the exhaust gas until the exhaust gas cools to a critical temperature at which the exhaust gas condenses.

6. The method of claim 5, wherein the critical temperature is less than about 250 degrees Celsius.

7. The method of claim 1, wherein the ultraviolet light source has a wavelength of about 124 nm or greater.

8. The method of claim 1, wherein the ultraviolet light source has a wavelength of about 172 nm.

9. A method for removing an exhaust gas, comprising:
    flowing an exhaust gas from a semiconductor process chamber through an exhaust apparatus coupled to the semiconductor process chamber, wherein the exhaust gas flows through an inner volume of the exhaust apparatus substantially free from obstruction;
    exposing the exhaust gas within the exhaust apparatus to an ultraviolet light source to at least partially decompose the exhaust gas as it flows through the exhaust apparatus, wherein the ultraviolet light source provides energy to the exhaust gas until the exhaust gas cools to a critical temperature at which the exhaust gas condenses; and
    flowing the at least partially decomposed exhaust gas from the exhaust apparatus.

10. The method of claim 9, wherein the critical temperature is less than about 250 degrees Celsius.

* * * * *